US007486779B2

(12) United States Patent
Brown et al.

(10) Patent No.: US 7,486,779 B2
(45) Date of Patent: Feb. 3, 2009

(54) ORIGIN DEVICE BASED CALLEE IDENTIFICATION

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 10/015,267

(22) Filed: Dec. 12, 2001

(65) Prior Publication Data

US 2003/0108158 A1  Jun. 12, 2003

(51) Int. Cl.
*H04M 1/64* (2006.01)
(52) U.S. Cl. ............. 379/88.02; 379/88.17; 379/88.19; 379/88.2; 379/142.04; 704/275
(58) Field of Classification Search ............ 379/142.09, 379/142.06, 142.17, 207.15, 67.1, 88.01, 379/88.02, 88.04, 88.11, 88.12, 88.2, 88.21–88.26, 379/142.07, 231, 88.17, 100.16, 372, 52; 704/246, 248, 251, 253, 275, 209, 243, 252; 370/352; 455/405
See application file for complete search history.

(56) References Cited

U.S. PATENT DOCUMENTS

| | | | | |
|---|---|---|---|---|
| 5,283,833 A | * | 2/1994 | Church et al. | 704/252 |
| 5,499,288 A | | 3/1996 | Hunt et al. | 379/88 |
| 5,533,109 A | * | 7/1996 | Baker | 379/201.03 |
| 5,594,784 A | * | 1/1997 | Velius | 379/88.02 |
| 5,623,539 A | * | 4/1997 | Bassenyemukasa et al. | 379/88.02 |
| 5,673,404 A | | 9/1997 | Cousins et al. | 395/347 |
| 5,790,637 A | | 8/1998 | Johnson et al. | 379/67 |
| 5,875,240 A | * | 2/1999 | Silverman | 379/142.07 |
| 5,915,001 A | | 6/1999 | Uppaluru | 379/88.22 |
| 5,940,476 A | | 8/1999 | Morganstein et al. | 379/88.02 |
| 5,946,654 A | | 8/1999 | Newman et al. | 704/246 |
| 6,038,305 A | | 3/2000 | McAllister et al. | 379/207 |

(Continued)

FOREIGN PATENT DOCUMENTS

EP  0585004 A2  3/1994

(Continued)

OTHER PUBLICATIONS

WPAT Derwent 1994-067503.

(Continued)

*Primary Examiner*—Md S Elahee
(74) *Attorney, Agent, or Firm*—H. Artoush Ohanian; Matthew Talpis; Biggers & Ohanian LLP (57) ABSTRACT

A method, system, and program for origin device initiated callee identification are provided. At an origin device, a voice utterance of a callee is detected from a destination device. A callee identity associated with the voice utterance is identified at the origin device, such that the callee identity is transmittable as an authenticated identity of the callee for a call. A caller may select whether to continue a call dependent upon whether the callee identity is preferable. In addition, an intermediary device may receive the callee identity and specify services available during the call according to the callee identity.

29 Claims, 5 Drawing Sheets

U.S. PATENT DOCUMENTS

| | | | |
|---|---|---|---|
| 6,041,103 A * | 3/2000 | La Porta et al. | 379/67.1 |
| 6,052,438 A * | 4/2000 | Wu et al. | 379/67.1 |
| 6,058,364 A | 5/2000 | Goldberg et al. | 704/252 |
| 6,101,242 A | 8/2000 | McAllister et al. | 379/88.02 |
| 6,122,357 A | 9/2000 | Farris et al. | 379/207 |
| 6,144,723 A * | 11/2000 | Truchon et al. | 379/88.01 |
| 6,167,119 A | 12/2000 | Bartholomew et al. | 379/88.04 |
| 6,178,230 B1 | 1/2001 | Borland | 379/67.1 |
| 6,647,097 B1 * | 11/2003 | Nashirozawa | 379/88.01 |
| 6,665,377 B1 * | 12/2003 | McKinley et al. | 379/88.01 |
| 6,678,359 B1 | 1/2004 | Gallick | 379/88.17 |
| 6,697,456 B2 * | 2/2004 | Chan et al. | 379/88.03 |
| 6,765,995 B1 * | 7/2004 | Kobayashi | 379/88.01 |
| 6,937,699 B1 * | 8/2005 | Schuster et al. | 379/67.1 |
| 2002/0058494 A1 * | 5/2002 | Timonen et al. | 455/405 |
| 2002/0118807 A1 | 8/2002 | Pedersen | |
| 2002/0181671 A1 * | 12/2002 | Logan | 379/88.13 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

OTHER PUBLICATIONS

WPAT Derwent 1995-346415.
WPAT Derwent 1996-315499.
WPAT Derwent 1999-031530.

* cited by examiner

ORIGIN DEVICE BASED CALLEE IDENTIFICATION

CROSS-REFERENCE TO RELATED APPLICATIONS

The present application is related to the following co-pending applications:
(1) U.S. patent application Ser. No. 10/015,381
(2) U.S. patent application Ser. No. 10/015,281
(3) U.S. patent application Ser. No. 10/015,265
(4) U.S. patent application Ser. No. 10/015,282
(5) U.S. patent application Ser. No. 10/015,280
(6) U.S. patent application Ser. No. 10/022,160
(7) U.S. patent application Ser. No. 10/022,158
(8) U.S. patent application Ser. No. 10/022,161
(9) U.S. patent application Ser. No. 10/022,624
(10) U.S. patent application Ser. No. 10/022,164
(11) U.S. patent application Ser. No. 10/022,163

BACKGROUND OF THE INVENTION

1. Technical Field

The present invention relates in general to telecommunications and, in particular, to voice identification. Still more particularly, the present invention relates to initiating authentication of the identity of a callee at an origin device.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. Services are personalized according to wireless telephone or wireline telephone number, where service associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

One of the services provided by many networks is caller identification. However, caller identification (caller ID) is limited to identification the wireline or wireless telephone number and the name of the subscriber of a service. Where multiple people share a single line, only the name of the person who establishes a service is displayed as the caller ID, often causing confusion about who is actually calling.

Caller ID is further limited in that it only flows from the calling party subscriber line to the called party. Multiple people may have access to a telephone device receiving a call, such that the calling party does not know now exactly who will answer a call. According to current caller ID systems, even if the caller ID where to flow back to the calling party, that caller ID would only indicate the name of the line subscriber to a phone number called by the calling party, and not the identity of the person answering the call.

In particular, while wireline telephone plans often bill a line subscriber at flat rate per month, wireless telephone plans often bill a line subscriber according to the minutes utilized per month. Where a wireless telephone is utilized to call a number that may be answered by multiple people, the wireless telephone caller must wait to see who answers, and thus be billed for the minutes, even if the person who the caller wants to speak with is not the person who answers.

Therefore, in view of the foregoing, it would be advantageous to provide a method, system, and program for providing an identification of the person answering a call to the calling party. In addition, it would be advantageous to provide a method, system, and program for providing an identification of the person answering a call to the calling party, such that the calling party may decide whether to speak to the person answering the call.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for initiating authentication of the identity of a callee at an origin device.

According to one aspect of the present invention, at an origin device, a voice utterance of a callee is detected from a destination device. A callee identity associated with the voice utterance is identified at the origin device, such that the callee identity is transmittable as an authenticated identity of the callee for a call. A caller may select whether to continue a call dependent upon whether the callee identity is preferable.

According to another aspect of the present invention, an authenticated callee identity for a call is received at an intermediary device. A callee profile for the authenticated callee identity is retrieved. Then, a selection of services from among multiple services that are offered for the call are specified according to the callee profile.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system, and program for origin device initiated callee identification are provided. By authenticating a callee identity at an origin device, the caller may decide whether to continue a call or indicate the name of the desired callee. In particular, the identity of the actual callee who answers a call is detected by the origin device, rather than just the name of the subscriber of a wireline or wireless number.

One advantage of origin device initiated callee identification includes performing callee identity authentication without requiring use of intermediary network resources. Another advantage of origin device initiated callee identification includes maintaining an address book of voice samples of callees at the origin device, where the caller may choose to only continue calls with callees in the address book. In particular, the caller may also have more confidence in a callee identity authenticated at the origin device because the caller may independently verify and store the voice samples at the origin device.

Where needed, a third party server may be accessed by the origin device to aid in callee identity authentication. Authentication by a third party server allows the callee authenticated identity to be verified by an external source without use of intermediary network resources. In addition, a third party server may store voice samples independent of the origin devices, but in a trusted manner. Further, where a caller utilizes multiple origin calling devices throughout the day, the caller may choose to store an address book of voice samples at the third party device, where the third party device is accessible to the multiple origin calling devices.

While in the present invention, authentication of a callee identity is described with emphasis placed on voice authentication, other methods of callee identity authentication may also be performed. Voice samples utilized for voice authentication are just one of multiple types of biometric sampling. For example, a callee may locally provide an eye scan, a fingerprint, and other biophysical identifiers that are transmitted within or outside the trusted network to authenticate the identity of the callee. Alternatively, keypad entries, such as a pin code, credit card account number, password, or other secure transaction key may be entered by a callee and utilized to authenticate the identity of the callee.

In addition, while in the present invention, authentication of a callee identity is described with emphasis upon performing authentication at the beginning of a call, authentication of a callee identity may be performed continuously throughout a call, at selected points throughout a call, and after a call. Selected points where authentication may be performed include when an additional phone pick-up is detected, when a new voice is detected at the origin device, when a call is transferred from one telephone device to another, and other routing of a call that may result in a new callee or in a call being recorded.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

For purposes of the present invention, telephony devices are termed origin devices when utilized for origination of a call to an intermediary device and are termed destination devices when utilized for receipt of a call from an intermediary device. Subscribers are termed callers when originating a call and are termed callees when receiving a call.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Figure 1:
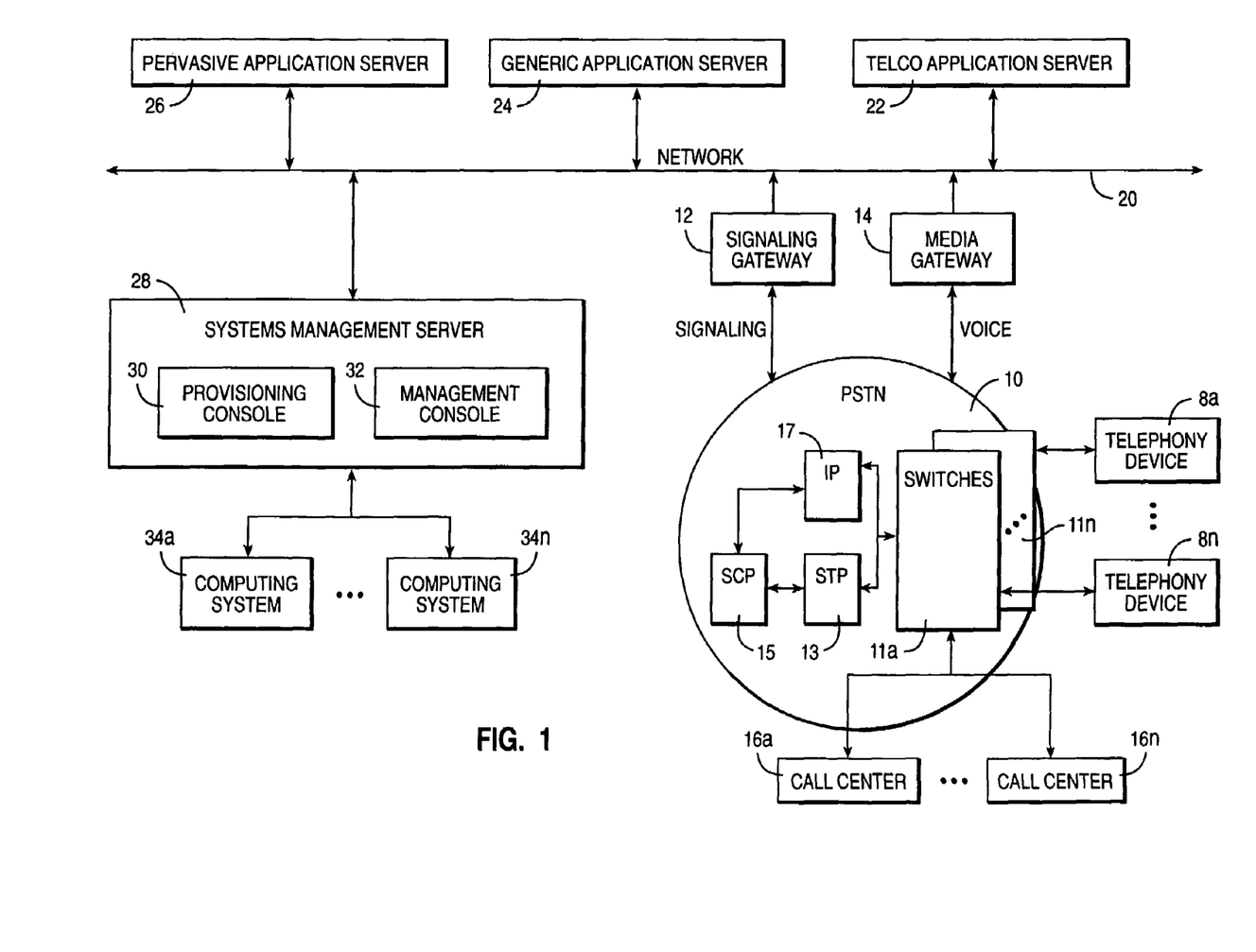
FIG. 1 depicts a block diagram of a network environment in which the present invention may be implemented.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via network 20 is totally untrusted and therefore may require authentication and additional security.

In the present invention, network 20 may comprise a private network, Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. Such services may also be provided to calls within PSTN 10, however placing such services at a third party, such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a-8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a-34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11a-11n, that originate, terminate, or tandem calls. Central office switches 11a-11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a-11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a-11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller or callee is authenticated according to voice authentication. Voice authentication is preferably performed by first identifying a caller or callee by matching the name or other identifier spoken with a caller name or identifier. Next, voice authentication requires verifying that the voice audio signal matches that of the identified caller or callee. However, in alternate embodiments, the identity of a caller or callee may be authenticated according to passwords, eye scans, encryption, and other security devices.

In particular, to perform identity authentication of audio signals received from callers or callees, IP 17 may include storage for specific templates or voice feature information, for use in authenticating callers or callees based on speech. If a specific template is not stored on a local IP 17, then a remote IP containing the specific template may be accessed via a network. In addition, local IP 17 may access systems management server 28 or another repository for voice imprints to access the specific template.

Where IP 17 authenticates the identity of a caller (e.g. the person or subscriber placing a call), a voice identifier (VID) representing the authenticated caller identity is transferred as a signal for identifying the caller. In addition, where IP 17 authenticates the identity of a callee (e.g. the person or subscriber receiving a call), a reverse VID (RVID) including the callee identity is transferred as a signal for identifying the callee.

Advantageously, VIDs and RVIDs indicate through text, voice, or video the identity of a caller and a callee. For example, a caller's name may be transferred as the identity of a caller. Alternatively, a video clip stored with the template may be transferred as the identity of a caller. Additionally, VIDs and RVIDs may indicate the identity of the device utilized by a caller or callee to provide context for a call. Further, VIDs and RVIDs may indicate which system or systems have authenticated the caller or callee identity.

After a VID and/or RVID are determined by IP 17, IP 17 and SCP 15 may communicate to designate which services are available according to VID and RVID. Advantageously, by designating services according to a VID and/or RVID, callers and callees are provided with services and billed for those services independent of the devices utilized by callers and callees. In particular, a 1129 protocol or other protocol may be utilized to enable signal communications between IP 17 and SCPs 15. In addition, as previously described, voice authentication to determine VIDs and RVIDs may be performed by a third party, such as telco application server 22.

An origin telephony device or destination telephony device may also determine a VID and/or RVID for the caller and/or callee of a call. In particular, telephony devices 8a-8n and call centers 16a-16n may function as origin and designation telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a-8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a-8n.

However, in addition to authentication according to voice identification and recognition, telephony devices 8a-8n may be equipped to receive other biometric type input. For example, telephony devices 8a-8n include an eye print scanner, a fingerprint scanner, and other devices that detect individual human characteristics. Preferably, telephony devices 8a-8n may receive these other types of biometric input and compare other types of biometric input with previous recorded samples to determine the identity of a caller.

In addition, telephony devices 8a-8n may each incorporate a display that provides a visual output of a VID or RVID. Alternatively, such a display may be provided in a separate device connected to the line in parallel to telephones 8a-8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a-8n are communicatively connected to PSTN 10 via wireline, wireless, ISDN, and other communication links. Preferably, connections to telephony devices 8a-8n provide digital transport for two-way voice grade type telephone communications and a channel transporting signaling data messages in both directions between telephony devices 8a-8n and PSTN 10.

In addition to telephony devices 8a-8n, advanced telephone systems, such as call centers 16a-16n, may be communicatively connected to PSTN 10 via wireline, wireless, ISDN and other communication links. Call centers 16a-16n may include PBX systems, hold queue systems, private network systems, and other systems that are implemented to handle distribution of calls to multiple representatives or agents.

Returning to central office switches 11a-11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a-11n. The assigned telephone number includes the area code (NPA) and exchange code (NXX) for the serving central office and four unique digits (XXXX).

Central office switches 11a-11n utilize office equipment (OE) numbers to identify specific equipment, such as physical links or circuit connections. For example, a subscriber's line might terminate on a pair of terminals on the main distribution frame of one of central office switches 11a-11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, a VID for the caller may be authenticated at the origin telephony device, the IP, or the destination telephony device and transferred to the central office switch. The central office switch then retrieves and loads profile information according to the caller VID, rather than the OE number for the line.

In addition, in the present invention, a reverse VID (RVID) for the callee may be authenticated at the origin telephony device. The caller may then determine whether to open voice communications with the callee, to request an alternate callee, or to hang up.

RVID Authentication Context

Figure 2:
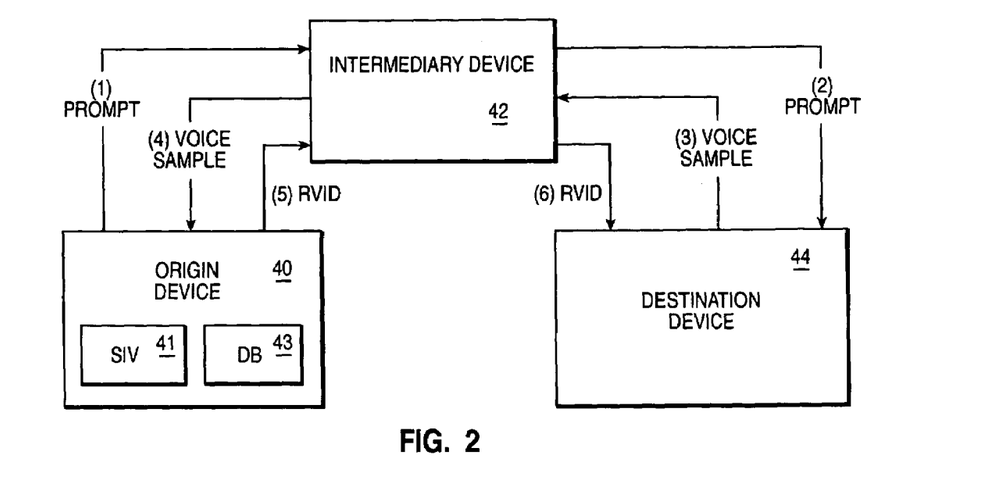
FIG. 2 illustrates a block diagram of the flow of a voice identifier authenticated by an origin device in accordance with the method, system, and program of the present invention.

Referring now to FIG. 2, there is illustrated a block diagram of the flow of a voice identifier authenticated by an origin device in accordance with the method, system, and program of the present invention.

As depicted, an origin device 40 authenticates a RVID for a current callee. In particular, origin device 40 may include a caller telephony device, as previously described. However, origin device 40 may also include a PBX, call center or other private switching system that manages multiple telephony devices. Moreover, origin device 40 may include network servers, feature servers, and other systems which provide call origination.

A service identification/verification (SIV) 41 feature within origin device 40 may determine the identity of a callee and authenticate that identity by comparing a voice utterance made by a callee at destination device 44 with a database of voice samples stored in a voice sample database 43 within origin device 40. The voice utterance may include, for example, the callee's name and the callee's service provider.

Where a caller utilizes origin device 40 to initiate a call to a callee at destination device 44, an intermediary device 42 is accessed to process the call between origin device 40 and destination device 44. In particular, intermediary device 42 may include, but is not limited to, a PSTN switching network, a PBX, a call center, a private switching system, network servers, telco application servers, Websphere7 (Websphere7 is a registered trademark of International Business Machines, Inc.) servers, and other systems which provide call processing functions. Destination device 44 may include, but is not limited to, a callee telephony device, a PBX, a call center, a private switching system, network servers, feature servers, client side devices, and other systems which provide call receipt.

In response to an answer to destination device 44, origin device 40 preferably transmits a prompt to the destination device, to prompt the callee (the person answering the call) to provide a voice utterance. The voice sample is analyzed by SIV 41 and compared with voice samples in voice sample database 43, to authenticate the identity of the callee. The identity of the callee is authenticated in a RVID.

Origin device 40 may forward the RVID to intermediary device 42 and destination device 44. Intermediary device 42 may utilize the RVID to specify services provided for the call. The callee may confirm the RVID at destination device 44.

Origin device 40 advantageously includes a display device or other output interface for output of the authenticated RVID to the caller, such that the identity of the callee of an incoming call is provided to the caller. The caller may then decide whether to communicate with the callee depending on the RVID.

According to one advantage of the present invention, the caller may also indicate the specify callee for whom the caller is calling. The caller may specify a callee by selecting the callee within the caller's address book, where the identifier for the preferred callee is then transferred with the call request from origin device 40 to destination device 44. Alternatively, the caller may enter the name of the preferred callee through voice, text, or keypad input. The preferred callee identity may be displayed at destination device 44 and/or utilized to select a type of ring output by destination device 44.

In the present invention, a RVID preferably authenticates the identity of a callee. However, it is advantageous that the RVID also include other information that provides a context for a call. For example, the GPS location or time zone of the callee location, the device at which the call is receive, and whether a callee has answered on behalf of another, may be included in a RVID.

A RVID may be transferred in multiple protocols, including, but not limited to, Interface Definition Language (IDL). A RVID may include a range of information, where each type of information may be tagged or identified in some other manner. For example, the following tagged RVID may be transmitted to represent an authenticated identity of a callee:

[callee name] Jon Smith
[callee device] Jane Doe's cell phone
[callee location] Central Time zone Origin device 40 may output all the information included in a RVID or a selection of the information. For example, for the tagged RVID described above, origin device 40 may output the following to an input/output interface associated with origin device 40:

ACall picked up by Jon Smith, using Jane Doe's cell phone@

In addition, origin device 40 may interpret the information included in a RVID. For example, for the tagged RVID described above, origin device 40 may interpret the location and output the following:

AIt is currently 4:00 PM at Jon Smith's location@

Further, origin device 40 may perform other functions with a RVID. For example, origin device 40 may translate the RVID into a particular language. In addition, origin device 40 may request additional information for a RVID from a third party server.

Figure 3:
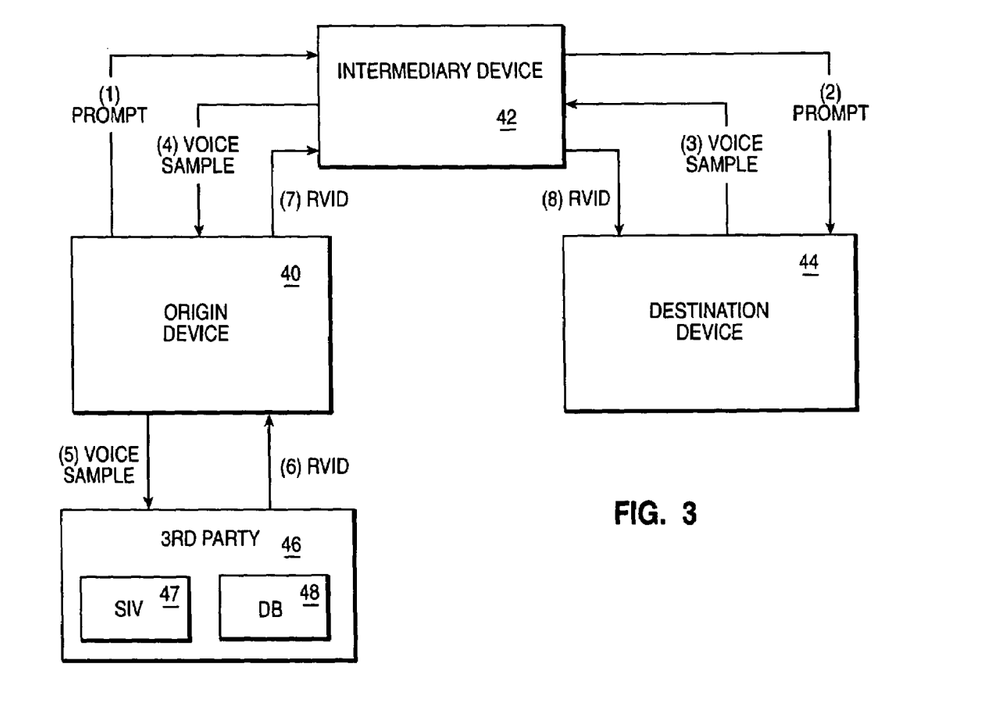
FIG. 3 depicts a block diagram of the flow of a voice identifier authenticated by a third party device accessible from an origin device in accordance with the method, system, and program of the present invention.

With reference now to FIG. 3, there is depicted a block diagram of the flow of a voice identifier authenticated by a third party device accessible from an origin device in accordance with the method, system, and program of the present invention.

As illustrated, origin device 40 may access a third party device 46 with a request for RVID authentication. Third party device 46 may include a telco application server, accessible via a network, that performs callee authentication. However, third party device 46 may also be a stand alone system or a server connected to a PBX, a private switching system, or a service provider switching system.

Third party device 46 may include an SIV 47 feature that receives a voice utterance received via origin device 40 from destination device 44 and authenticates an identity of a callee associated with the voice utterance by comparing the voice utterance with a database 48 of voice samples stored at third party device 46. Third party device 46 then returns an RVID containing the identity of the callee. Origin device 40 may add additional information to the RVID to provide context for the call, where the additional information is received from intermediary 42 and destination device 44.

Communications between origin device 40 and third party device 46 may be facilitated by intermediary device 42. In addition, communications between origin device 40 and third party device 46 may be facilitated by a network, such as the Internet, an Intranet, or a private networking service.

SIV 47 may implement levels of security in communications with origin device 40. For example, a secure channel utilizing a secure socket layer may be implemented. In addition, other encryption techniques may be implemented for transfer of information.

Alternatively, origin device 40 may access a database of voice samples stored at third party device 46. Where origin device 40 requests voice samples from third party device 46, origin device 40 may, for example, request a selection of voice samples for a name identified from a voice utterance. Origin device 40 then authenticates a RVID for the callee.

In an example, a voice utterance provided by a callee may include a name and a service provider from which the callee receives service. Origin device 40 may then contact the third party service provider device 46 and request either an authentication of the voice utterance or voice samples for a name identified from the voice utterance. The third party service provider advantageous stores voice samples for each customer, such that identity authentication may be performed.

In another example, multiple callers may utilize a single origin device 40, where each caller has an address book of preferred callees. The database of voice samples for preferred callees of each caller may be stored at origin device 40, however it would be advantageous to also store that database of voice samples at third party device 46, such that each of those multiple callers may also utilize alternative origin device, but receive authentication of callees stored within an address book of preferred callees.

In general, it is advantageous that a caller may access an address book of preferred callees across multiple diverse origin devices. Therefore, third party device 46 may be accessible across multiple diverse origin devices via network 20, such that a caller may access an address book at any origin device.

Figure 4:
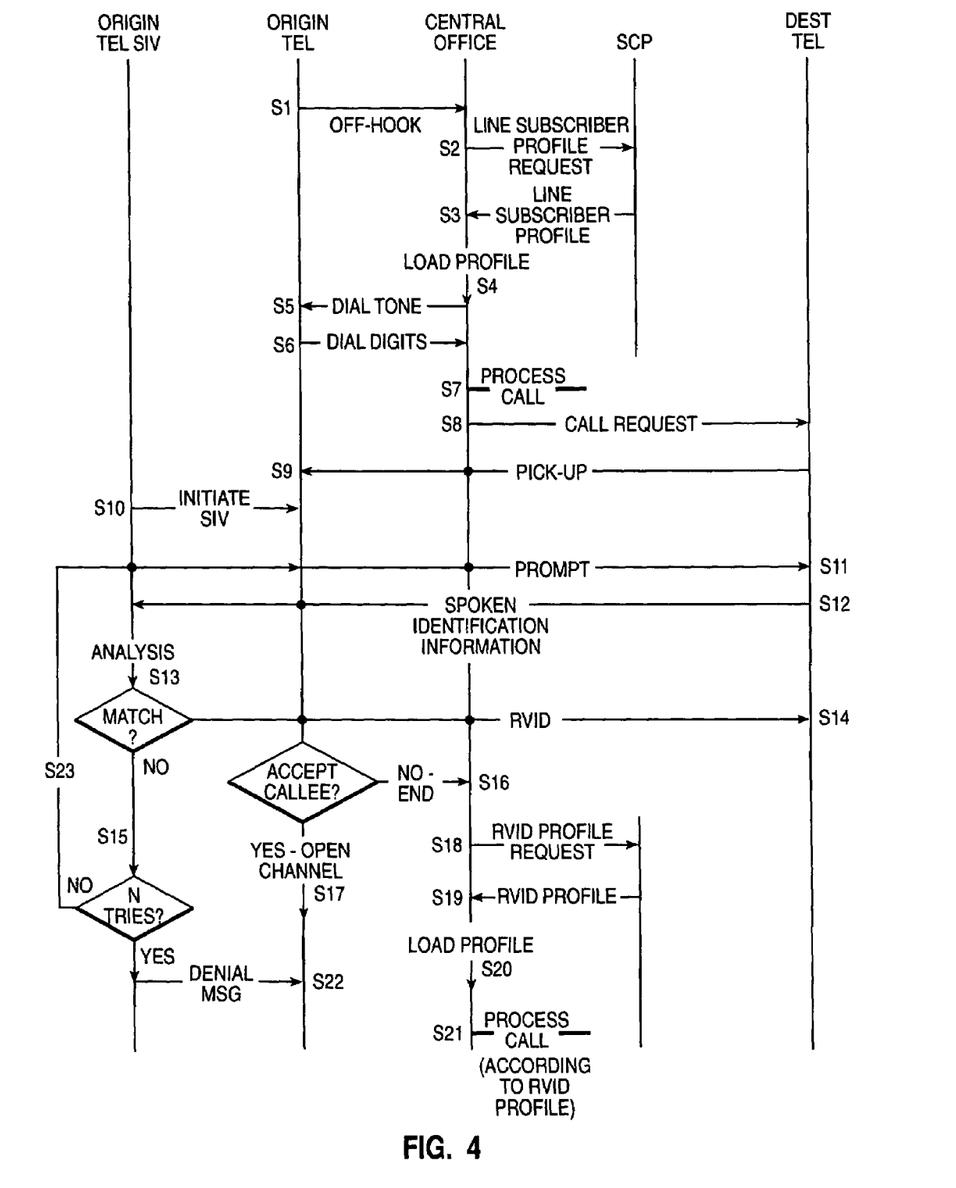
FIG. 4 illustrates a flow diagram of a signal flow and processing where an origin device authenticates a callee identity in accordance with the method, system, and program of the present invention.

Referring now to FIG. 4, there is illustrated a flow diagram of a signal flow and processing where an origin device authenticates a callee identity in accordance with the method, system, and program of the present invention. A standard telephone device is assumed for the Atel@ origin device in the present example. However, a similar signal flow may be applied to other types of origin devices.

The caller lifts a handset creating an off-hook state in the origin device and a corresponding signal change in state signal to the central office (step S1). In response to detecting an off-hook signal at the central office, call processing commences. Specifically, the central office assigns a register to the call and loads information associated with the OE for the off-hook line into the assigned register. In addition, detecting the off-hook state at the origin device triggers a request to the SCP for a profile of the line subscriber (step S2). The SCP stores profiles for each line subscriber that indicate the services available for the line. The SCP returns the line subscriber profile (step S3) and the central office loads the line subscriber profile into the assigned register for specifying services available during the call (step S4). While the example is described for a line subscriber profile, in alternate embodiments, the VID for a caller may be authenticated by the origin device, the intermediary network, or a destination device and utilized to load a caller profile to specify services for a call.

In response to loading a line subscriber profile into the assigned register, a dial tone may be extended from the central office to the origin device (step S5). In return, the caller may input digits that are transmitted to the central office to be utilized to determine the routing of a call (step S6). In particular, a caller may enter digits utilizing, for example, a keypad or voice dialing. In addition, the caller may indicate a name or other identifier for a preferred callee. In particular, the caller may select the preferred callee from an address book stored at the origin device. Alternatively, the caller may speak the name of the callee.

The call is then processed through the PSTN and other networks to connect the origin device with a destination device (step S7). A call request is extended to the destination device indicating the subscriber line number and the preferred callee (step S8). Alternatively, the VID of the caller may be indicated if previously authenticated. The name of the preferred callee may be displayed with the subscriber line number and/or may be utilized to select a particular ring for indicating the call request. For example, where multiple people share the destination telephone, a distinct ring may be designated for each person.

In response to an answer at the destination device, a pickup signal is transmitted back to the origin device (step S9). The origin device then initiates the SIV within the origin device (step S10). The SIV initiates a prompting instruction to the callee to provide specific identifying information (step S11). It should be mentioned that although the SIV could passively monitor any speech that the callee may utter, it is advantageous to specifically prompt the callee. For example, the SIV may play an audio prompt message asking the callee to APlease say your full name.@ In addition, the prompt may request other identifying information such as a service provider and subject of the call, for example. Further, the central office may trigger a SIV initiation to an IP at other times during a call. The spoken identification information is then received at the origin device and transferred to the SIV (step S12).

Analysis is performed on the spoken identification information to determine a name of a callee and extract speech characteristics information (step S13). A voice template or other voice pattern information may be stored in the origin device according to a callee identity. In addition, voice template information may be stored at a third party server accessible to the origin device. Preferably, the SIV compares the extracted speech information to the stored pattern information, to identify and authenticate the particular callee. If there is a match between the extracted speech information and the stored pattern information, then a RVID signal containing the authenticated identity of the callee is distributable among multiple devices (step S14). Although not depicted, a callee receiving the RVID at the destination device may confirm or deny the correctness of the authenticated identity. If the callee denies the correctness of the authenticated identity, then the authentication process may be performed again, or the callee may be asked for additional identification.

If there is not a match between the extracted speech information and the stored pattern information, then a determination as to the number of tries is made (step S15). If more than n tries for authentication have been made, then a denial message is returned to the origin device (step S22). However, if n tries have not yet been made, then another prompting is output to the callee (step S23).

In addition to authenticating the identity of the callee receiving a call, the identity of the device utilized to receive the call may be included in a RVID. Each destination device may include an identification number that is returned with the pick-up signal and attached to the RVID of a call at the origin device. Alternatively, where a single OE line includes multiple outlets, the device at each outlet may be identified according to the location of the outlet.

In response to an RVID returned to the origin device, the caller is provided with an option of whether to accept the callee. If the caller does not accept the callee, then the call may be terminated (step S16) or an addition request for the preferred callee may be transmitted. If the caller does accept the callee, then the voice channel may be opened at the origin device (step S17).

In addition, in response to an RVID returned to the central office, a request is triggered to the SCP for a profile according to the RVID (step S18). In particular, the profile may be stored at the SCP, a telco application server, or other database server accessible from the central office. The callee profile according to RVID is preferably returned to the central office (step S19) and loaded into the assigned register for the call (step S20). The call is then processed according to the services available in the RVID profile (step S21).

It should be noted that with each transfer of an RVID, the central office, the SCP, and the origin device may each record and filter the RVID. In particular, filtering the RVID may require blocking all or portions of the content of the RVID.

Figure 5A:
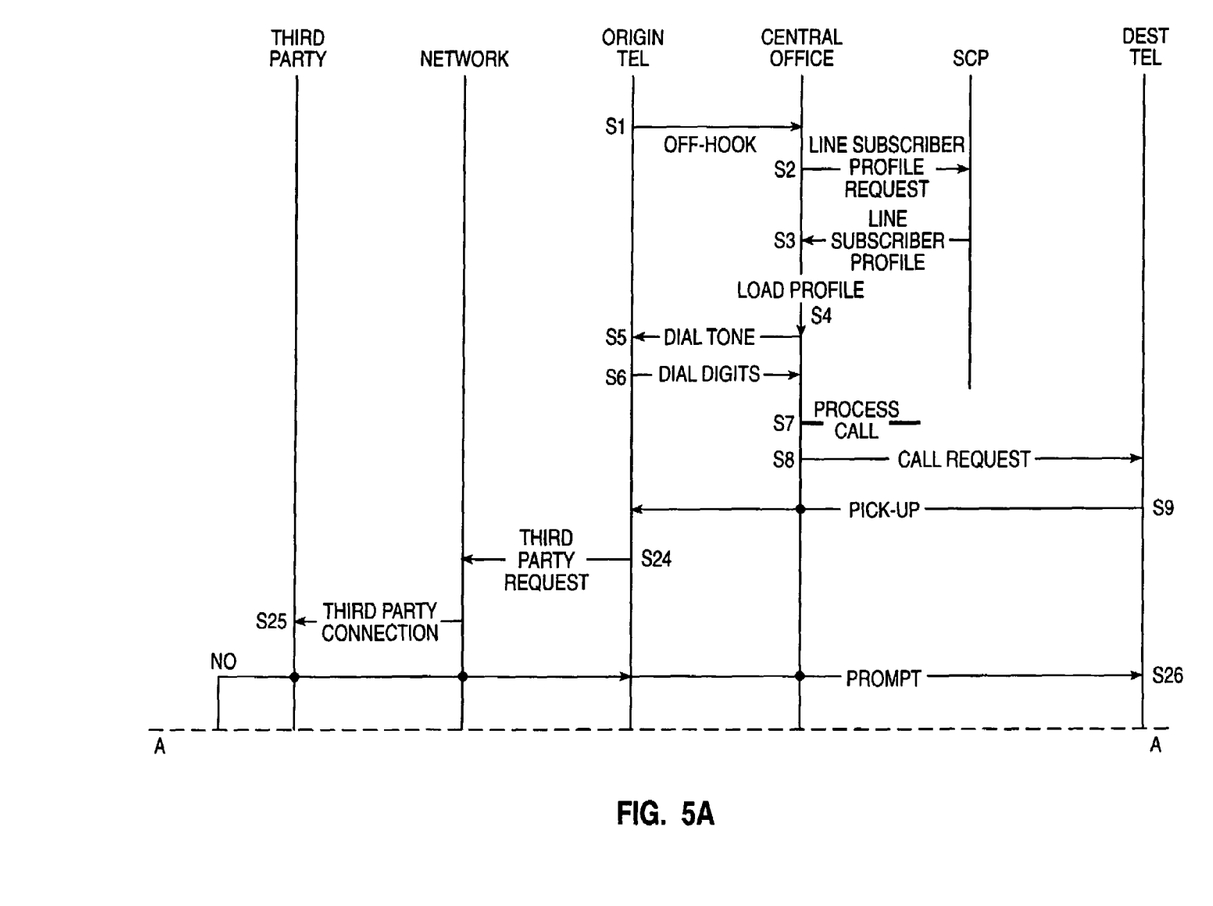
FIG. 5 depicts a flow diagram of a signal flow and processing where a third party system is accessed by an origin device to authenticate a callee identity in accordance with the method, system, and program of the present invention.
Figure 5B:
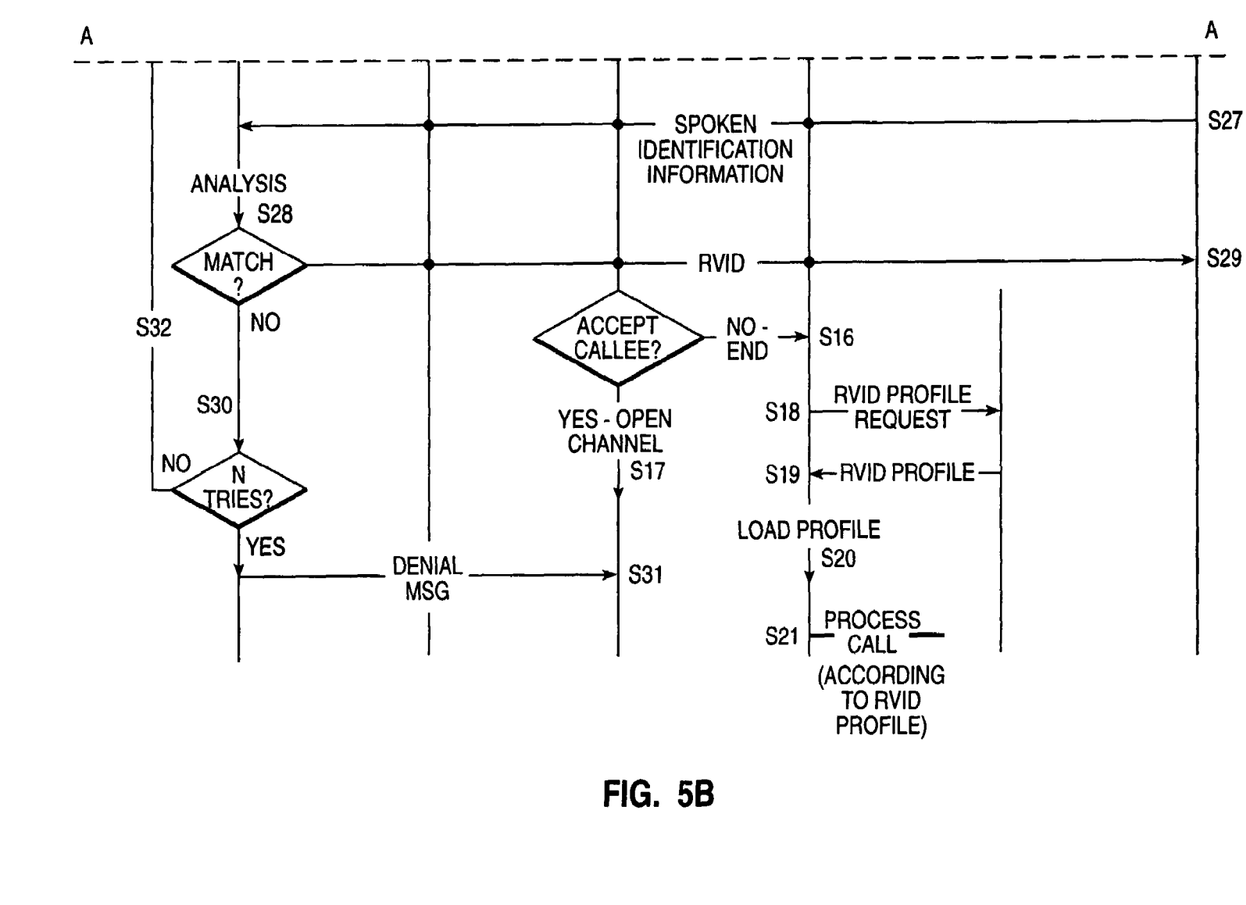

With reference now to FIG. 5, there is depicted a flow diagram of a signal flow and processing where a third party system is accessed by an origin device to authenticate a callee identity in accordance with the method, system, and program of the present invention.

In response to receiving a pick-up signal at the origin device, a third party connection request is transmitted from the origin device to a network (step S24). In particular, the network may include a service provider server system that is accessible from the origin device by a wireless or wireline connection. In addition, the request for a network connection may first transfer to a central office of a switching system that then forwards the call via a network to a telco application server or other third party server. The network preferably accesses the third party server and creates a communication channel between the origin device and the third party server (step S25).

The third party server initiates an identity authentication process for authenticating the identity of the current callee. First, an authorization service application provides a prompting instruction via the origin device to the callee to provide specific identifying information (step S26). For example, the authorization service application may play an audio prompt message asking the callee to APlease say your full name.@ The spoken identification information via a voice channel to the origin device is transferred via the network to the third party server (step S27).

Analysis is performed on the spoken identification information to determine a name of a callee and extract speech characteristics information (step S28). A voice template or other voice pattern information may be accessible to the third party server from a local or remote database management system. Preferably, the authorization service application compares the extracted speech information to the stored pattern information, to identify and authenticate the particular callee. If there is a match between the extracted speech information and the stored pattern information, then a RVID signal containing the authenticated identity of the callee is then distributable among multiple devices from the origin device (step S29).

If there is not a match of the extracted speech information with the voice templates, then a determination is made as to whether a callee has made more than n tries to speak identification information that has not matched (step S30). If the callee has not made more than n tries, then a prompt is output to the callee via the origin device to provide another spoken utterance (step S32). If the callee has made more than n tries, then a denial message is output to the origin device (step S31).

Whether the origin device authenticates a callee identity locally or via a third party system, such as a telco application server, the RVID of a callee is utilized to specify services provided to the callee. An advantage of authenticating a callee identity via a third party system is that the RVID is authorized by a third party system, rather than an origin system that is not as trusted within the network.

It should be noted that with each transfer of an RVID, the central office, signaling gateway, telco application server, and origin device may each record and filter the RVID. In particular, filtering the RVID may require blocking all or portions of the content of the RVID.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for identifying a particular callee, said method comprising:
   detecting, at an origin device, a voice utterance of a callee from a destination device;
   identifying, at said origin device, a callee identity associated with said voice utterance, such that said callee identity is transmittable as an authenticated identity of said callee for a call, further comprising:
   transmitting said voice utterance to a third party device via a network; and
   receiving said callee identity from said third party device.

2. The method for identifying a particular callee according to claim 1, further comprising:
   prompting said callee, from said origin device, to provide said voice utterance.

3. The method for identifying a particular callee according to claim 1, further comprising:
   prompting said callee to enter an additional input to verify said callee identity.

4. The method for identifying a particular callee according to claim 1, wherein identifying a callee identity further comprises:
 extracting speech characteristics from said voice utterance; and
 comparing said speech characteristics with a plurality of voice samples stored for identifying a plurality of callees.

5. The method for identifying a particular callee according to claim 1, further comprising:
 requesting a voice sample for said particular callee from a third party device accessible via a network; and
 receiving said voice sample for said particular callee for enabling authenticating of said callee identity.

6. The method for identifying a particular callee according to claim 1, further comprising:
 displaying said callee identity to said caller at said origin device, wherein said caller is enabled to select whether to continue said call according to said callee identity.

7. The method for identifying a particular callee according to claim 1, further comprising:
 enabling said caller to identify a preferred callee at said origin device; and
 transferring an identifier for said preferred callee to said destination device, wherein said destination device is enabled to adjust output according to said identifier for said preferred callee.

8. The method for identifying a particular callee according to claim 1, wherein said origin device is a private exchange network.

9. The method for identifying a particular callee according to claim 1, wherein said origin device is a telephony device.

10. The method for identifying a particular callee according to claim 1, wherein said callee identity comprises at least one from among a callee name, a callee location, a subject of said call, and a device identification.

11. A system for identifying a particular callee, said system comprising:
 an origin device connected to a telephone network;
 means for detecting, at said origin device, a voice utterance of a callee from a destination device;
 means for identifying, at said origin device, a callee identity associated with said voice utterance, wherein said callee identity is transmittable as an authenticated identity of said callee for a call, further comprising:
  means for transmitting said voice utterance to a third party device via a network; and
  means for receiving callee identity from said third party device.

12. The system for identifying a particular callee according to claim 11, further comprising:
 means for prompting said callee, from said origin device, to provide said voice utterance.

13. The system for identifying a particular callee according to claim 11, further comprising:
 means for prompting said callee to enter an additional input to verify said callee identity.

14. The system for identifying a particular callee according to claim 11, wherein said means for identifying a callee identity further comprises:
 means for extracting speech characteristics from said voice utterance; and
 means for comparing said speech characteristics with a plurality of voice samples stored for identifying a plurality of callees.

15. The system for identifying a particular callee according to claim 11, further comprising:
 means for requesting a voice sample for said particular callee from a third party device accessible via a network; and
 means for receiving said voice sample for said particular callee for enabling authenticating of said callee identity.

16. The system for identifying a particular callee according to claim 11, further comprising:
 means for displaying said callee identity to said caller at said origin device, wherein said caller is enabled to select whether to continue said call according to said callee identity.

17. The system for identifying a particular callee according to claim 11, further comprising:
 means for enabling said caller to identify a preferred callee at said origin device; and
 means for transferring an identifier for said preferred callee to said destination device, wherein said destination device is enabled to adjust output according to said identifier for said preferred callee.

18. The system for identifying a particular callee according to claim 11, wherein said origin device is a private exchange network.

19. The system for identifying a particular callee according to claim 11, wherein said origin device is a telephony device.

20. The system for identifying a particular callee according to claim 11, wherein said callee identity comprises at least one from among a callee name, a callee location, a subject of said call, and a device identification.

21. A method for identifying a callee, comprising:
 detecting a voice utterance of a callee at a origin device originating a call;
 accessing at least one voice imprint from a third party server;
 responsive to matching said voice utterance with said at least one voice imprint, authenticating said identity of said callee according to a callee identification stored in association with said voice imprint and authenticating an identity of said callee from said voice utterance at said origin device; and
 enabling output of said authenticated identity from said origin device, such that a caller accessing said origin device is informed of an identity of said callee.

22. The method for identifying a callee according to claim 21, further comprising:
 comparing said voice utterance with at least one voice imprint stored at said origin device; and
 responsive to matching said voice utterance with said at least one voice imprint, authenticating said identity of said callee according to a callee identification stored in association with said voice imprint.

23. The method for identifying a callee according to claim 21, wherein said output comprises displayable output to a graphical user interface.

24. The method for identifying a caller according to claim 21, wherein said output comprises audio output via a speaker.

25. A system for identifying a callee, comprising:
 an origin device for originating a call;
 means for detecting a voice utterance of a callee at said origin device;
 means for accessing at least one voice imprint from a third party server;
 means responsive to matching said voice utterance with said at least one voice imprint, for authenticating said identity of said callee according to a callee identification stored in association with said voice imprint;

means for authenticating an identity of said callee from said voice utterance at said origin device; and means for enabling output of said authenticated identity from said origin device, such that a caller accessing said origin device is informed of an identity of said callee.

26. The system for identifying a callee according to claim 25, further comprising:

means for comparing said voice utterance with at least one voice imprint stored at said origin device; and means responsive to matching said voice utterance with said at least one voice imprint, for authenticating said identity of said callee according to a callee identification stored in association with said voice imprint.

27. The system for identifying a callee according to claim 25, wherein said output comprises displayable output to a graphical user interface.

28. The system for identifying a caller according to claim 25, wherein said output comprises audio output via a speaker.

29. A method for identifying a particular callee, said method comprising:

detecting, at a call initiating telephony apparatus, a voice utterance of a callee from a destination device, further comprising:

transmitting said voice utterance to a third party device via a network; and receiving said callee identity from said third party device; and identifying, at the call initiating telephony apparatus, a callee identity associated with said voice utterance, such that said callee identity is transmittable as an authenticated identity of said callee for a call.

* * * * *